(No Model.)
G. W. ALDRICH.
MEAT BROILER.
No. 557,096. Patented Mar. 31, 1896.
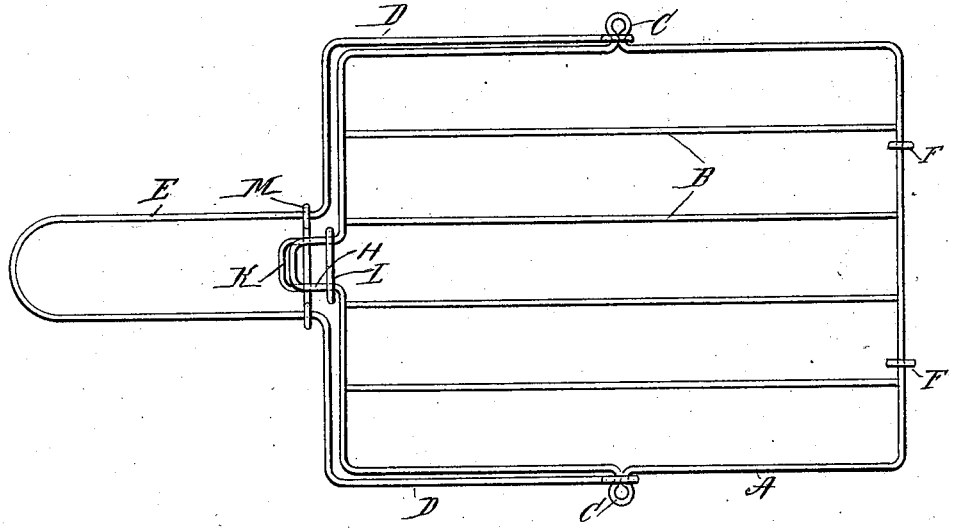
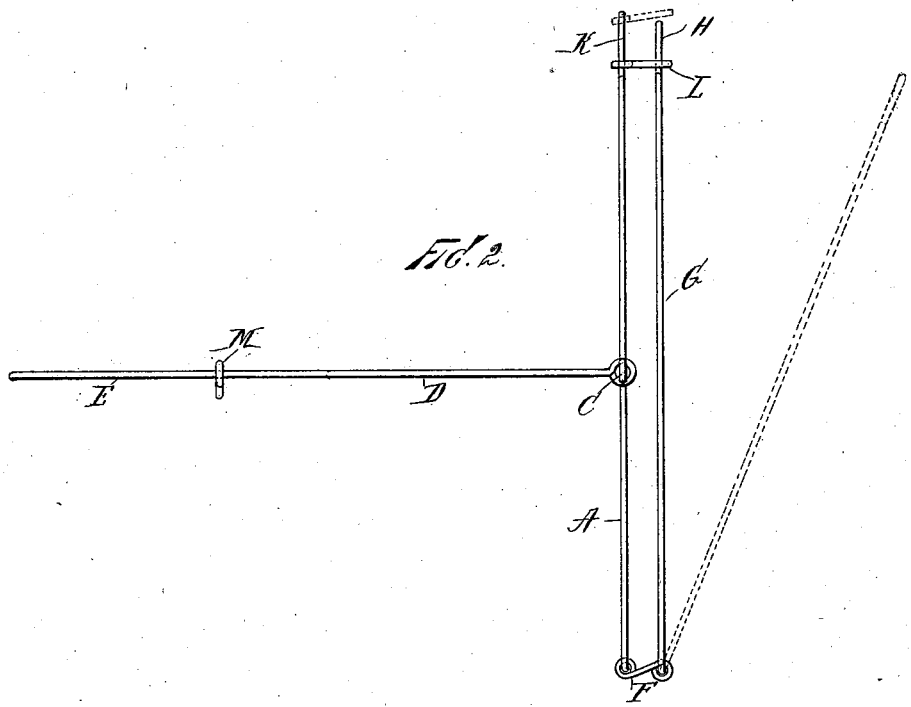
WITNESSES:
John Buckler,
A. M. Cusack
INVENTOR
George W. Aldrich
BY
Edgar Tate & Co
ATTORNEYS

UNITED STATES PATENT OFFICE.

GEORGE W. ALDRICH, OF BROOKLYN, NEW YORK, ASSIGNOR TO GEORGE A. WARD, OF SAME PLACE.

MEAT-BROILER.

SPECIFICATION forming part of Letters Patent No. 557,096, dated March 31, 1896.

Application filed July 5, 1895. Serial No. 555,002. (No model.)

*To all whom it may concern:*

Be it known that I, GEORGE W. ALDRICH, a citizen of the United States, and a resident of Brooklyn, county of Kings, and State of New York, have invented certain new and useful Improvements in Meat-Broilers, of which the following is a specification, reference being had to the accompanying drawings, forming a part thereof, in which similar letters of reference indicate corresponding parts in both figures.

This invention relates to meat-broilers; and the object thereof is to produce a simple and effective device of this character, which consists of two separate wire frames hinged together at one end and adapted to be connected at the other end, between which the meat to be broiled is placed and secured, and a handle hinged to one of said frames centrally thereof, so that the frame may be revolved therein.

The invention is fully disclosed in the following specification, of which the accompanying drawings form a part, and in which—

Figure 1 is a plan view of my improved meat-broiler; and Fig. 2, an edge view thereof, showing the method of connecting and operating the separate parts.

In the practice of my invention I employ a frame A, which is composed of wire and provided with cross-bars B, as shown in Fig. 1. The frame A is preferably rectangular in form, and about midway of each side thereof is formed a loop C, to which is hinged the separate sides D of the handle E, which is also composed of wire and bent into the form shown in Fig. 1, so that the frame A may be turned or revolved therein.

Connected with one end of the frame A, by means of hinges F, which are composed of wire and bent into the form shown in Fig. 2, is a supplemental frame G, similar in form and construction to the frame A, with the exception of the loops C, and the frame G is provided opposite the hinges F with a loop or extension H, and the frame A is also provided with a similar loop or extension K, with which is connected a ring or catch L, which is adapted to be passed over the extension or loop H of the frame G, as shown in Figs. 1 and 2, and the ring or catch L is also adapted to slide on the loop or extension K of the frame A, as will be readily understood. The handle E is also provided with a sliding ring or loop M, which is adapted to be passed over either or both of the extensions or loops K and H of the frames A and G, respectively, so as to hold said frames in a fixed position when desired, and it will also be observed that there is a space between the frames A and G, as shown in Fig. 1, within which the meat to be broiled is placed.

The operation will be readily understood from the foregoing description, when taken in connection with the accompanying drawings.

The meat to be broiled is placed between the frames A and G, and said frames are secured together by means of the loop or ring L, as will be readily understood, and the said frames may also be then secured in position relative to the handle E by means of the ring or loop L, connected therewith. As thus constructed it will be observed that the broiler is revoluble at will in the hand of the operator, and that it also may be revolved or turned on the ends D of the handle E, as will be readily understood, and I thus accomplish the object of my invention by means of a device which is simple in construction and operation and comparatively inexpensive.

Having fully described my invention, I claim and desire to secure by Letters Patent—

A meat-broiler consisting of separate wire frames, rectangular in form, and one of which is hinged to the other at one end and adapted to be secured thereto at the opposite end, a handle consisting of wire, the sides of which are bent to inclose the frame of the broiler, and are pivotally hinged to the sides of one of said frames at or near the middle thereof, each of said frames being provided with extensions or loops by which they may be connected by means of a ring or catch mounted thereon, and said handle being also provided with a ring or loop by which the ends of the broiler adjacent thereto, may be connected therewith, substantially as shown and described.

In testimony that I claim the foregoing as my invention I have signed my name, in presence of two witnesses, this 28th day of June, 1895.

GEORGE W. ALDRICH.

Witnesses:
    L. M. MULLER,
    M. A. KNOWLES.